US007027624B2

(12) United States Patent
Monden

(10) Patent No.: US 7,027,624 B2
(45) Date of Patent: Apr. 11, 2006

(54) PATTERN COLLATION DEVICE AND PATTERN COLLATING METHOD THEREOF, AND PATTERN COLLATION PROGRAM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 600 days.

(21) Appl. No.: 10/106,444

(22) Filed: Mar. 27, 2002

(65) Prior Publication Data

US 2002/0181782 A1 Dec. 5, 2002

(30) Foreign Application Priority Data

Mar. 29, 2001 (JP) ............................ 2001-096223

(51) Int. Cl.
*G06K 9/00* (2006.01)

(52) U.S. Cl. ...................... 382/124; 382/125; 382/209; 382/278; 382/282

(58) Field of Classification Search ........ 382/124–125, 382/206, 209, 218, 276, 278, 282, 285, 115, 382/116, 190, 275; 356/71; 340/5.53, 5.83
See application file for complete search history.

(56) References Cited

U.S. PATENT DOCUMENTS 5,883,971 A * 3/1999 Bolle et al. ................. 382/124
5,909,501 A * 6/1999 Thebaud ..................... 382/124
6,049,621 A * 4/2000 Jain et al. ................... 382/125
6,466,686 B1 * 10/2002 Senior ........................ 382/124

FOREIGN PATENT DOCUMENTS

EP 0 866 424 A2 9/1998
JP 2-187885 A 7/1990
JP 5-81412 A 4/1993
JP 6-4671 A 1/1994
JP 8-30783 A 2/1996
JP 8-147411 A 6/1996
JP H08-249422 A 9/1996
JP 10-105703 A 4/1998
JP 10-124684 A 5/1998

(Continued)

OTHER PUBLICATIONS

Andrew W. Senior, et al.; "Improved Fingerprint Matching by Distortion Removal"; IEICE Transactions on Information and Systems; Institute of Electronics Information and Comm. Eng.; Tokyo, JP; vol. E84-D, No. 7; Jul. 2001; pp. 825-832.

*Primary Examiner*—Bhavesh M. Mehta
*Assistant Examiner*—John Strege
(74) *Attorney, Agent, or Firm*—Sughrue Mion, PLLC

(57) ABSTRACT

A pattern collation device for comparing and collating graphic forms includes a deformation estimating unit for estimating deformation generated in a graphic form to be examined which is a graphic form as an object of examination based on information about a feature point indicative of features in each of the graphic form to be examined in question and a model graphic form as a graphic form based on which comparison is made, a deformation correcting unit for correcting the graphic form to be examined in question based on information about the deformation estimated by the deformation estimating unit and a similarity determining unit for comparing the graphic form to be examined whose deformation is corrected by the deformation correcting unit with the model graphic form as a graphic form based on which comparison is made to calculate similarity therebetween.

50 Claims, 12 Drawing Sheets

FOREIGN PATENT DOCUMENTS

| | | | |
|---|---|---|---|
| JP | 10-124685 | A | 5/1998 |
| JP | 10-240932 | A | 9/1998 |
| JP | 10-261089 | A | 9/1998 |
| JP | 2000-132691 | A | 5/2000 |
| JP | 2000-512047 | A | 9/2000 |
| WO | WO 86/05903 | A1 | 10/1986 |

* cited by examiner

CL

| | |
|---|---|
| P1 | $(a_1, b_1)$ |
| P2 | $(a_2, b_4)$ |
| P3 | $(a_3, b_2)$ |
| P4 | $(a_4, b_4)$ |
| P5 | $(a_4, b_5)$ |
| ⋮ | ⋮ |

PATTERN COLLATION DEVICE AND PATTERN COLLATING METHOD THEREOF, AND PATTERN COLLATION PROGRAM

BACKGROUND OF THE INVENTION

1. Field of the Invention

The present invention relates to collation of image data and, more particularly, to a pattern collation device for identifying linear graphic forms such as fingerprints and characters and a pattern collating method thereof, and a pattern collation program.

2. Description of the Related Art

As conventional devices for recognizing linear image patterns such as fingerprints and characters, the techniques are proposed in Japanese Patent Laying-Open (Kokai) No. Heisei 10-240932 and Japanese Patent Laying-Open (Kokai) No. Heisei 10-105703 in which using features points such as an end point and a branch point of a line, corresponding feature points are obtained and overlapped with each other for comparison.

Conventional techniques in which deformation of a graphic form is corrected to compare images have been proposed in Japanese Patent Laying-Open (Kokai) No. Heisei 02-187885, Japanese Patent Laying-Open (Kokai) No. Heisei 05-081412, Japanese Patent Laying-Open (Kokai) No. Heisei 06-004671, Japanese Patent Laying-Open (Kokai) No. Heisei 08-030783 and Japanese Patent Laying-Open (Kokai) No. Heisei 08-147411.

The conventional art, however, has the following shortcomings.

The conventional techniques recited in Japanese Patent Laying-Open No. Heisei 10-240932 and Japanese Patent Laying-Open No. Heisei 10-105703 have a problem that because the techniques employ a system of comparing graphic forms which are overlapped with each other as a whole, in such a case where a character is deformed or a fingerprint is deformed at the time of fingerprinting, the patterns can not be properly discriminated.

On the other hand, according to the conventional techniques recited in Japanese Patent Laying-Open No. Heisei 02-187885, Japanese Patent Laying-Open No. Heisei 05-081412, Japanese Patent Laying-Open No. Heisei 06-004671, Japanese Patent Laying-Open No. Heisei 08-030783 and Japanese Patent Laying-Open No. Heisei 08-147411, even when a graphic form is deformed, if the graphic form has the same deformation as a whole, correcting the deformation of the graphic form as a whole and comparing the same enables such a form to be coped with. However, in a case where each part has a different manner of deformation, an allowable difference should be increased to result in having inaccurate discrimination.

SUMMARY OF THE INVENTION

An object of the present invention is to solve the above-described conventional problems and provide a linear graphic form pattern collation device which is capable of strictly discriminating an applied graphic form even when it is deformed and a pattern collating method thereof, and a pattern collation program.

Even when a graphic form to be examined is deformed, the present invention enables the graphic form to be examined which is a graphic form as an object of examination and a model graphic form which is a graphic form based on which comparison is made to be strictly discriminated from each other by estimating deformation generated in the graphic form to be examined based on applied feature point information of the graphic form to be examined and applied feature point information of the model graphic form, correcting the estimated deformation and comparing the graphic form to be examined whose deformation has been corrected and the model graphic form to calculate similarity therebetween.

According to the first aspect of the invention, a pattern collation device for comparing and collating a graphic form to be examined and a model graphic form as a graphic form based on which comparison is made, comprises deformation estimating means for estimating deformation generated in a graphic form to be examined which is a graphic form as an object of examination based on information about a feature point indicative of features in each of the graphic form to be examined in question and a model graphic form as a graphic form based on which comparison is made, and deformation correcting means for correcting the graphic form to be examined in question based on information about the deformation estimated by the deformation estimating means.

In the preferred construction, the deformation estimating means correlates and pairs feature points in each of the graphic form to be examined and the model graphic form between which a difference in feature quantity indicative of a degree of features at the feature point is small and determines the contents of deformation of the graphic form to be examined which best match correspondences between the respective feature points to estimate deformation generated in the graphic form to be examined in question.

In another preferred construction, the deformation estimating means selects the contents of deformation of the graphic form to be examined which best match correspondences between the respective feature points in each of the graphic form to be examined and the model graphic form from a plurality of deformation models indicative of the contents of deformation of image data which are prepared in advance.

In another preferred construction, the deformation estimating means has information of a deformation model indicative of the contents of deformation of image data corresponding to a value designated by an individual parameter, and determines the contents of deformation of the graphic form to be examined by obtaining a value of each the parameter which provides the deformation model that best matches correspondences between the respective feature points in each of the graphic form to be examined and the model graphic form.

In another preferred construction, the deformation estimating means re-estimates deformation using only feature point pairs left after excluding the paired feature points which go apart from each other by a distance equal to or greater than a predetermined threshold value when subjected to estimated deformation.

In another preferred construction, the deformation estimating means changes the deformation model in question to re-estimate deformation when the scale of estimated deformation is larger than a predetermined threshold value.

In another preferred construction, the deformation estimating means, after estimating deformation of the graphic form to be examined as a whole, divides the graphic form to be examined in question into small regions to estimate the contents of deformation at each the small region.

In another preferred construction, the deformation estimating means, after estimating deformation of the graphic form to be examined as a whole, refers, with respect to each feature point pair in question, to information of the feature point pairs in the vicinity to estimate and correct deformation in the vicinity of each the feature point pair.

In another preferred construction, as the deformation model, elastic deformation is used and as data indicative of the scale of deformation, elastic energy is used.

In another preferred construction, as the graphic form to be examined and the model graphic form, at least either a fingerprint image or a palmprint image is used.

According to the second aspect of the invention, a deformation correcting device for comparing a graphic form to be examined and a model graphic form as a graphic form based on which comparison is made to correct deformation, comprises deformation estimating means for estimating deformation generated in a graphic form to be examined which is a graphic form as an object of examination based on information about a feature point indicative of features in each of the graphic form to be examined in question and a model graphic form as a graphic form based on which comparison is made, and deformation correcting means for correcting the graphic form to be examined in question based on information about the deformation estimated by the deformation estimating means.

In the preferred construction, the deformation estimating means correlates and pairs feature points in each of the graphic form to be examined and the model graphic form between which a difference in feature quantity indicative of a degree of features at the feature point is small and determines the contents of deformation of the graphic form to be examined which best match correspondences between the respective feature points to estimate deformation generated in the graphic form to be examined in question.

In another preferred construction, the deformation estimating means selects the contents of deformation of the graphic form to be examined which best match correspondences between the respective feature points in each of the graphic form to be examined and the model graphic form from a plurality of deformation models indicative of the contents of deformation of image data which are prepared in advance.

In another preferred construction, the deformation estimating means has information of a deformation model indicative of the contents of deformation of image data corresponding to a value designated by an individual parameter, and determines the contents of deformation of the graphic form to be examined by obtaining a value of each the parameter which provides the deformation model that best matches correspondences between the respective feature points in each of the graphic form to be examined and the model graphic form.

In another preferred construction, the deformation estimating means re-estimates deformation using only feature point pairs left after excluding the paired feature points which go apart from each other by a distance equal to or greater than a predetermined threshold value when subjected to estimated deformation.

In another preferred construction, the deformation estimating means changes the deformation model in question to re-estimate deformation when the scale of estimated deformation is larger than a predetermined threshold value.

In another preferred construction, the deformation estimating means, after estimating deformation of the graphic form to be examined as a whole, divides the graphic form to be examined in question into small regions to estimate the contents of deformation at each the small region.

In another preferred construction, the deformation estimating means, after estimating deformation of the graphic form to be examined as a whole, refers, with respect to each feature point pair in question, to information of the feature point pairs in the vicinity to estimate and correct deformation in the vicinity of each the feature point pair.

In another preferred construction, as the deformation model, elastic deformation is used and as data indicative of the scale of deformation, elastic energy is used.

In another preferred construction, as the graphic form to be examined and the model graphic form, at least either a fingerprint image or a palmprint image is used.

According to the third aspect of the invention, a pattern collating method of comparing and collating a graphic form to be examined and a model graphic form as a graphic form based on which comparison is made, comprising the steps of the deformation estimating step of estimating deformation generated in a graphic form to be examined which is a graphic form as an object of examination based on information about a feature point indicative of features in each of the graphic form to be examined in question and a model graphic form as a graphic form based on which comparison is made, and the deformation correcting step of correcting the graphic form to be examined in question based on information about the estimated deformation.

In the preferred construction, at the deformation estimating step, feature points in each of the graphic form to be examined and the model graphic form between which a difference in feature quantity indicative of a degree of features at the feature point is small are correlated and paired to determine the contents of deformation of the graphic form to be examined which best match correspondences between the respective feature points, thereby estimating deformation generated in the graphic form to be examined in question.

In another preferred construction, at the deformation estimating step, the contents of deformation of the graphic form to be examined which best match correspondences between the respective feature points in each of the graphic form to be examined and the model graphic form are selected from a plurality of deformation models indicative of the contents of deformation of image data which are prepared in advance.

In another preferred construction, at the deformation estimating step, based on information of a deformation model indicative of the contents of deformation of image data corresponding to a value designated by an individual parameter, the contents of deformation of the graphic form to be examined are determined by obtaining a value of each the parameter which provides the deformation model that best matches correspondences between the respective feature points in each of the graphic form to be examined and the model graphic form.

In another preferred construction, at the deformation estimating step, deformation is re-estimated using only feature point pairs left after excluding the paired feature points which go apart from each other by a distance equal to or greater than a predetermined threshold value when subjected to estimated deformation.

In another preferred construction, at the deformation estimating step, the deformation model in question is changed to re-estimate deformation when the scale of estimated deformation is larger than a predetermined threshold value.

In another preferred construction, at the deformation estimating step, after estimating deformation of the graphic form to be examined as a whole, the graphic form to be examined in question is divided into small regions to estimate the contents of deformation at each the small region.

In another preferred construction, at the deformation estimating step, after estimating deformation of the graphic form to be examined as a whole, with respect to each feature point pair in question, deformation in the vicinity of each the feature point pair is estimated and corrected by referring to information of the feature point pairs in the vicinity.

In another preferred construction, as the deformation model, elastic deformation is used and as data indicative of the scale of deformation, elastic energy is used.

In another preferred construction, as the graphic form to be examined and the model graphic form, at least either a fingerprint image or a palmprint image is used.

According to another aspect of the invention, a pattern collation program for comparing and collating a graphic form to be examined and a model graphic form as a graphic form based on which comparison is made by controlling a computer, comprising the functions of the deformation estimating function of estimating deformation generated in a graphic form to be examined which is a graphic form as an object of examination based on information about a feature point indicative of features in each of the graphic form to be examined in question and a model graphic form as a graphic form based on which comparison is made, and the deformation correcting function of correcting the graphic form to be examined in question based on information about the estimated deformation.

According to a further aspect of the invention, a deformation correcting method of comparing a graphic form to be examined and a model graphic form as a graphic form based on which comparison is made to correct deformation, comprising the steps of the deformation estimating step of estimating deformation generated in a graphic form to be examined which is a graphic form as an object of examination based on information about a feature point indicative of features in each of the graphic form to be examined in question and a model graphic form as a graphic form based on which comparison is made, and the deformation correcting step of correcting the graphic form to be examined based on information about the estimated deformation.

In the preferred construction, at the deformation estimating step, feature points in each of the graphic form to be examined and the model graphic form between which a difference in feature quantity indicative of a degree of features at the feature point is small are correlated and paired to determine the contents of deformation of the graphic form to be examined which best match correspondences between the respective feature points, thereby estimating deformation generated in the graphic form to be examined in question.

In another preferred construction, at the deformation estimating step, the contents of deformation of the graphic form to be examined which best match correspondences between the respective feature points in each of the graphic form to be examined and the model graphic form are selected from a plurality of deformation models indicative of the contents of deformation of image data which are prepared in advance.

In another preferred construction, at the deformation estimating step, based on information of a deformation model indicative of the contents of deformation of image data corresponding to a value designated by an individual parameter, the contents of deformation of the graphic form to be examined are determined by obtaining a value of each the parameter which provides the deformation model that best matches correspondences between the respective feature points in each of the graphic form to be examined and the model graphic form.

In another preferred construction, at the deformation estimating step, deformation is re-estimated using only feature point pairs left after excluding the paired feature points which go apart from each other by a distance equal to or greater than a predetermined threshold value when subjected to estimated deformation.

In another preferred construction, at the deformation estimating step, the deformation model in question is changed to re-estimate deformation when the scale of estimated deformation is larger than a predetermined threshold value.

In another preferred construction, at the deformation estimating step, after estimating deformation of the graphic form to be examined as a whole, the graphic form to be examined in question is divided into small regions to estimate the contents of deformation at each the small region.

In another preferred construction, at the deformation estimating step, after estimating deformation of the graphic form to be examined as a whole, with respect to each feature point pair in question, deformation in the vicinity of each the feature point pair is estimated and corrected by referring to information of the feature point pairs in the vicinity.

In another preferred construction, as the deformation model, elastic deformation is used and as data indicative of the scale of deformation, elastic energy is used.

In another preferred construction, as the graphic form to be examined and the model graphic form, at least either a fingerprint image or a palmprint image is used.

According to a still further aspect of the invention, a deformation correction program for comparing a graphic form to be examined and a model graphic form as a graphic form based on which comparison is made to correct deformation by controlling a computer, comprising the functions of the deformation estimating function of estimating deformation generated in a graphic form to be examined which is a graphic form as an object of examination based on information about a feature point indicative of features in each of the graphic form to be examined in question and a model graphic form as a graphic form based on which comparison is made, and the deformation correcting function of correcting the graphic form to be examined in question based on information about the estimated deformation.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
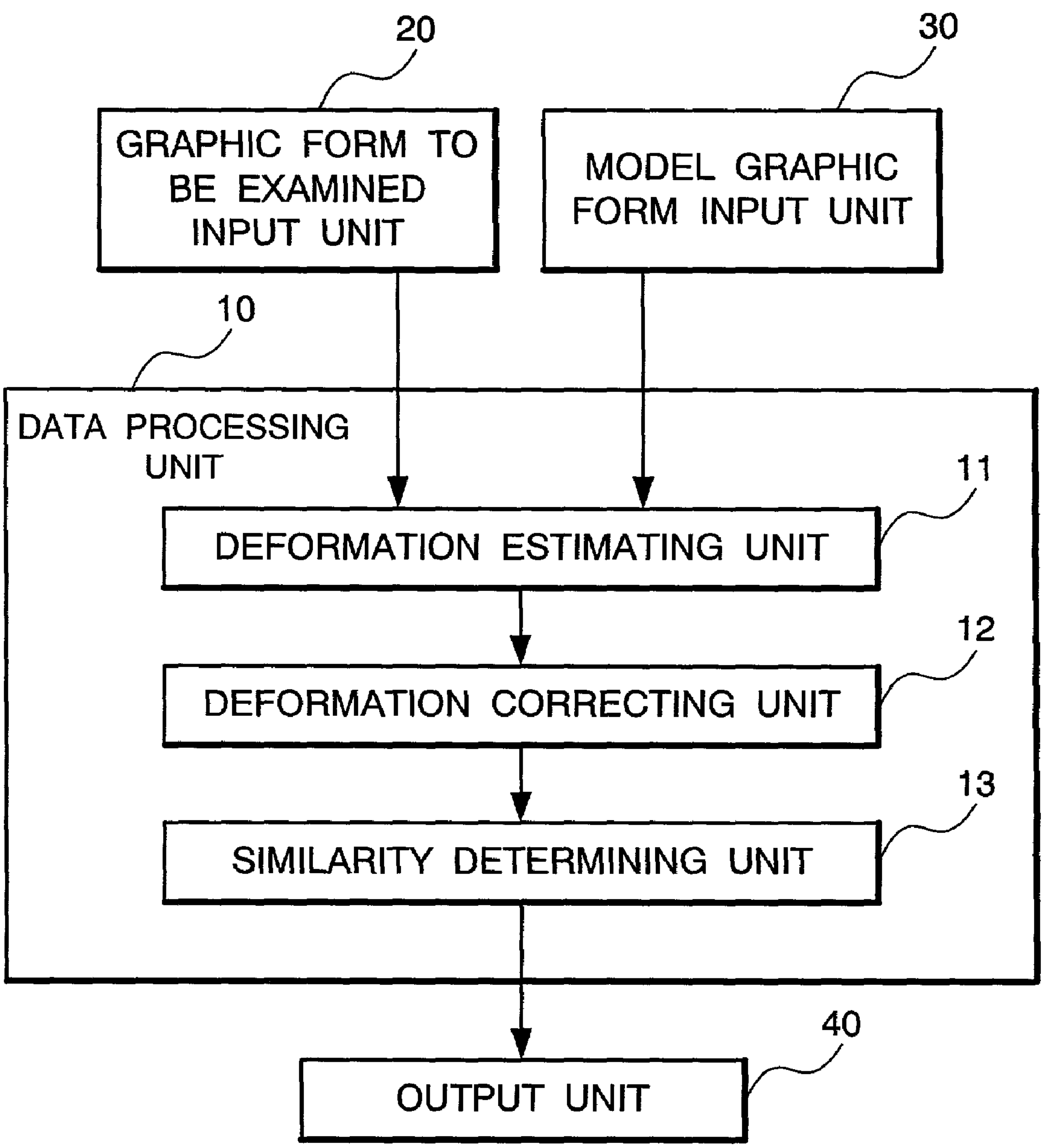
FIG. 1 is a block diagram showing a structure of a pattern collation device according to a first embodiment of the present invention.

FIG. 1 is a block diagram showing a structure of a pattern collation device according to a first embodiment of the present invention.

With reference to FIG. 1, the pattern collation device according to the present embodiment includes a graphic form to be examined input unit 20 for receiving input of data of a graphic form to be examined which is a graphic form as an object of examination, a model graphic form input unit 30 for receiving input of data of a model graphic form as a graphic form based on which comparison is made, a data processing unit 10 for executing processing of pattern collation and an output unit 40 for outputting a processing result.

The data processing unit 10 includes a deformation estimating unit 11, a deformation correcting unit 12 and a similarity determining unit 13. These units operate in a manner as outlined in the following.

The deformation estimating unit 11 compares a feature point of a graphic form to be examined which is input through the graphic form to be examined input unit 20 and a feature point of a model graphic form input through the model graphic form input unit 30 to estimate the contents of deformation generated as a whole in the graphic form to be examined.

The deformation correcting unit 12, based on data of the contents of the deformation estimated by the deformation estimating unit 11, subjects the graphic form to be examined to correction which eliminates the deformation to generate a graphic form to be examined whose deformation has been corrected.

The similarity determining unit 13 compares the graphic form to be examined which is generated by the deformation correcting unit 12 with its deformation corrected and the model graphic form to calculate similarity between the two graphic forms and outputs the calculated similarity to the output unit 40.

Next, operation of the present embodiment will be described in detail with reference to the drawings.

Figure 2:
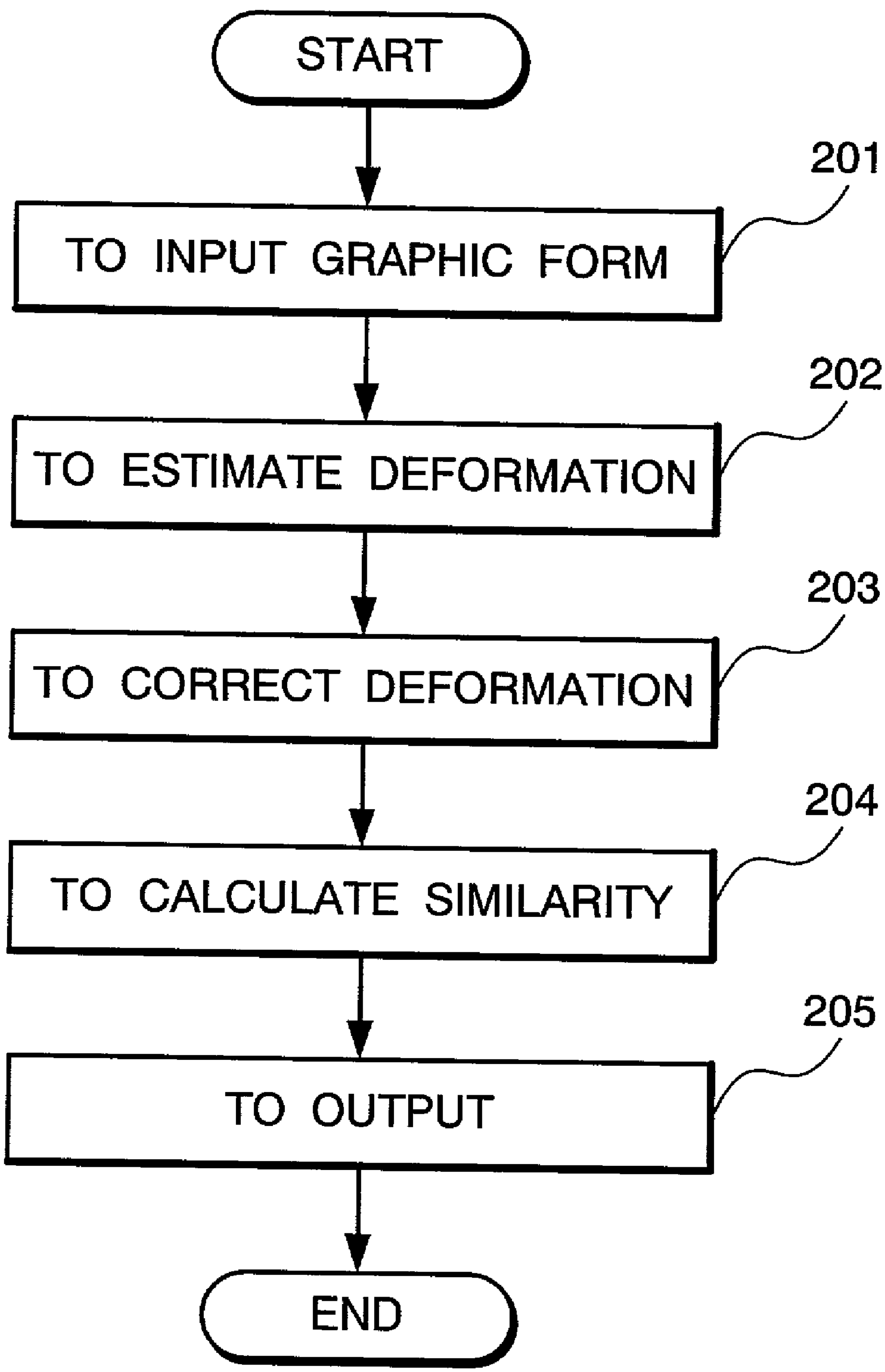
FIG. 2 is a flow chart for use in explaining processing of pattern collation according to the first embodiment of the present invention.
Figures 3, 4:
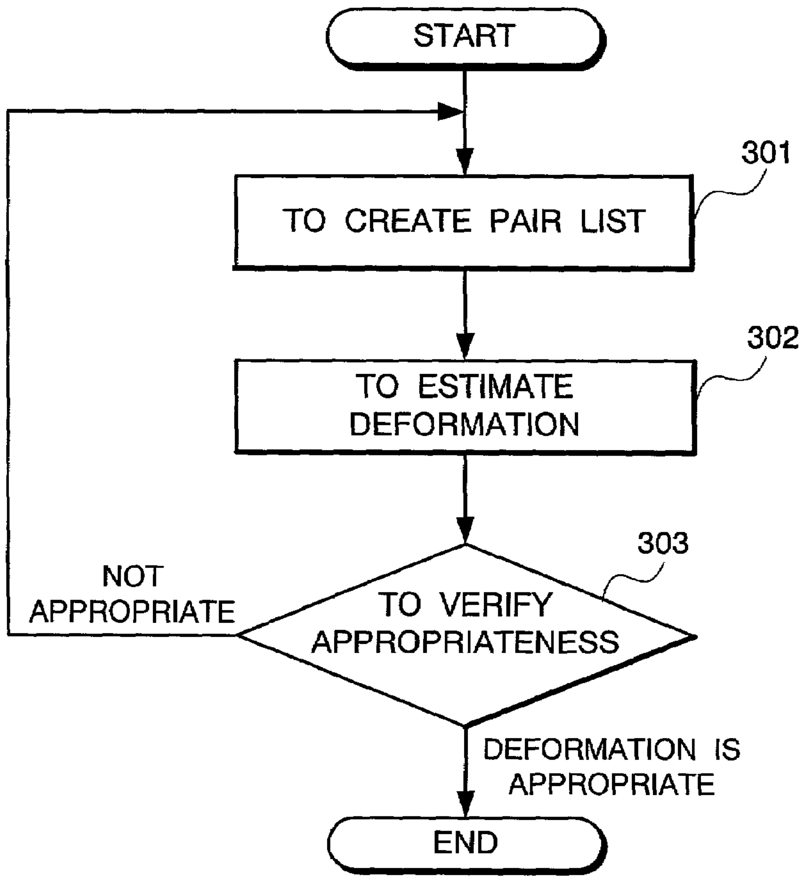
FIG. 3 is a flow chart for use in explaining processing of a deformation estimating unit according to the first embodiment of the present invention.
FIG. 4 is a diagram showing a list of feature point pairs for deformation estimation of one embodiment of the present invention.

FIG. 2 is a flow chart for use in explaining processing of pattern collation according to the present embodiment. FIG. 3 is a flow chart for use in explaining processing conducted by the deformation estimating unit 11 of the present embodiment.

With reference to FIG. 2, in the processing of pattern collation according to the present embodiment, first, a graphic form to be examined which is a graphic form as an object of examination and a model graphic form as a graphic form based on which comparison is made are applied to the graphic form to be examined input unit 20 and the model graphic form input unit 30, respectively (Step 201).

Employed as the method of inputting the respective graphic forms are, for example, that of inputting information of a feature point indicative of features of each graphic form which is extracted in advance and that of inputting image data of each graphic form and extracting information of its feature point on the side of the graphic form to be examined input unit 20 and the model graphic form input unit 30 to output extracted information to the data processing unit 10.

When applied to character recognition, for example, a method can be adopted of inputting image data of a character to be identified to the graphic form to be examined input unit 20 and inputting character data registered in a dictionary to the model graphic form input unit 30.

When applied to fingerprint recognition, for example, image data of a fingerprint whose owner is to be found can be input to the graphic form to be examined input unit 20 and fingerprint data registered in a fingerprint data base can be input to the model graphic form input unit 30.

In a manner as described above, the graphic form to be examined input unit 20 may receive input of feature point information of a graphic form to be examined which is extracted in advance or may receive input of a graphic form to be examined itself and extract information of a feature point at the graphic form to be examined input unit 20. Similarly, the model graphic input unit 30 may receive input of feature point information of a model graphic form which is extracted in advance or may receive input of a model graphic form itself and extract information of a feature point at the model graphic form input unit 30.

Here, among possible feature points of a graphic form to be examined and a model graphic form are a point at which a line ceases (end point), a point at which a line branches (branch point) and a point at which lines intersect with each other (intersection point). As a feature quantity which is data indicative of a degree of features at each feature point, such data as a position of a feature point and a direction of a line which touches a feature point can be used. Also as a feature quantity, values of a curvature of a line which touches a point and a curvature of a line adjacent to the same or information such as location of surrounding feature points and the number of lines crossing between surrounding feature points may be added.

Next, the data of each graphic form applied to the graphic form to be examined input unit 20 and the model graphic form input unit 30 is transferred to the deformation estimating unit 11 of the data processing unit 10. The deformation estimating unit 11 compares feature point information of the graphic form to be examined which is input through the graphic form to be examined input unit 20 and feature point information of the model graphic form input through the model graphic form input unit 30 to estimate deformation generated in the graphic form to be examined (Step 202).

The deformation estimating unit 11 selects a pair of feature points which can be considered to be the same feature point in the two graphic forms and based on a difference in position between these feature points in the two graphic forms, estimates deformation generated in the graphic form to be examined.

As to deformation generated in a graphic form here, in a case of comparison for character recognition between a character registered in a dictionary and a character input by a camera or the like, for example, an image of a character shot by a camera or the like which is input to the graphic form to be examined input unit 20 will be optically distorted at the time of input. In fingerprint recognition, in a case where data of a fingerprint whose owner is to be found is input to the graphic form to be examined input unit 20 and fingerprint data registered at a fingerprint data base is input to the model graphic input unit 30, a graphic form to be examined and a model graphic form are both deformed at the time of fingerprinting Here, while only with a graphic form to be examined and a model graphic form, deformation which the graphic form to be examined suffers and deformation which the model graphic suffers can not be obtained, detecting a difference in positional relationship of each individual feature point in both the graphic forms results in detecting deformation combining deformation inverse to the deformation which the model graphic form suffers and the deformation which the graphic form to be examined suffers, so that as deformation applying the detected deformation in a reverse direction, deformation for matching the graphic form to be examined with the model graphic form can be estimated.

Next, the deformation correcting unit 12 corrects the deformation of the graphic form to be examined by subjecting the graphic form to be examined to deformation having a reverse relationship with the deformation estimated by the deformation estimating unit 11 (Step 203).

Next, the similarity determining unit 13 compares the graphic form to be examined which is obtained with its deformation corrected by the deformation correcting unit 12 and the model graphic form to calculate similarity between the two graphic forms (Step 204).

Then, the output unit 40 outputs the similarity calculated at the similarity determining unit 13 (Step 205).

At Step 203, other than a method of subjecting the graphic form to be examined to deformation in reverse relationship with the deformation estimated at the deformation estimating unit 11, thereby correcting the deformation of the graphic form to be examined, a method can be adopted of subjecting the model graphic form to the deformation estimated at the deformation estimating unit 11, thereby matching deformation of the model graphic form and that of the graphic form to be examined with each other. This method enables comparison of the two graphic forms to calculate similarity between the two graphic forms at Step 204 in the same manner as described above.

Next, with reference to FIG. 3, detailed description will be made of deformation estimating processing at Step 202 of FIG. 2.

With reference to FIG. 3, first, compare feature point information of the graphic form to be examined which is applied through the graphic form to be examined input unit 20 and feature point information of the model graphic form which is applied through the model graphic form input unit 30 and sequentially register a pair of feature points determined to be corresponding feature points as a feature point pair for deformation estimation to create a list of feature point pairs for deformation estimation (Step 301).

At Step 301, for example, select one arbitrary feature point "a" from among feature points of the graphic form to be examined and one arbitrary feature point "b" from among feature points of the model graphic form to obtain a difference between a feature quantity of the feature point "a" and that of the feature point "b" and when the difference between these feature quantities is not greater than a predetermined threshold value, determine that they are corresponding feature points to register the pair of the feature points, the feature point "a" of the graphic form to be examined and the feature point "b" of the model graphic form which are determined to be corresponding feature points, at the list of feature point pairs for deformation estimation.

In the list of feature point pairs for deformation estimation, a pair of corresponding feature points composed of the feature point "a" of the graphic form to be examined and the feature point "b" of the model graphic is registered as illustrated in the example of FIG. 4.

Next, estimate deformation which best matches feature points as a pair registered in the list of feature point pairs for deformation estimation (Step 302).

Among methods which can be employed here are a method of selecting, from among deformation models indicative of the contents of deformation prepared in advance according to nature of a graphic form to be applied, a model which makes feature points of a pair be best matched from a plurality of deformation models and a method of obtaining, from among deformation models prepared in advance corresponding to values of various kinds of parameters, a value of a parameter which best matches feature points of each pair.

When applied to fingerprint recognition, for example, assuming that a finger is an elastic body, express its elastic deformation as a parameter (parallel displacement, shrinkage/expansion, rotation, shearing) and register, at the list of feature point pairs for deformation estimation, a position of each feature point obtained when a fingerprint input through the graphic form to be examined input unit 20 is subjected to elastic deformation indicated by each parameter to determine a parameter of elastic deformation such that the elastic deformation makes the positions of the feature points best match with each other.

Next, verify the estimated deformation and when the deformation is appropriate, output the deformation (Step 303).

At the verification of the appropriateness at Step 303, in a case, for example, where an elastic energy of the estimate deformation is larger than a predetermined value, considering that the estimated deformation is too large, the deformation model for use can be changed to try again to create a list of feature point pairs for deformation estimation.

Next, deformation estimating processing by the deformation estimating unit 11 according to the present embodiment will be described with respect to a more specific embodiment.

Figure 5:
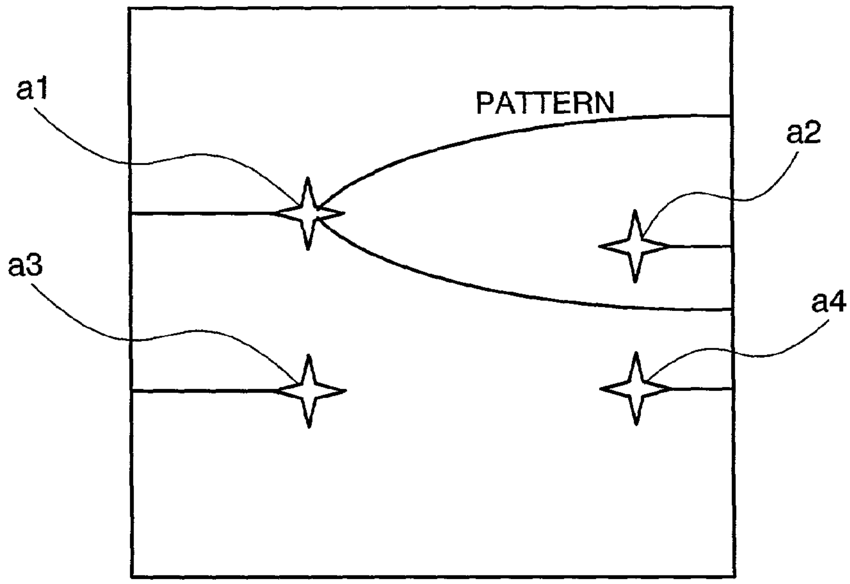
FIG. 5 is a diagram showing a model graphic form according to one embodiment of the present invention.
Figure 6:
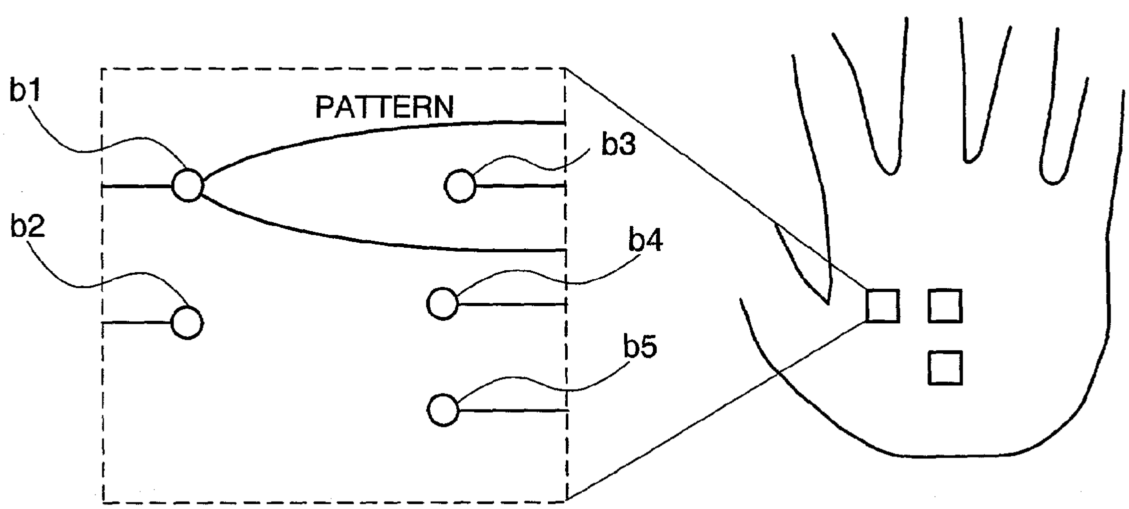
FIG. 6 is a diagram showing a graphic form to be examined according to one embodiment of the present invention.

Here, using one example of a model graphic form illustrated in FIG. 5 and one example of a graphic form to be examined shown in FIG. 6, description will be made of processing of estimating deformation of the graphic form to be examined to check whether the graphic form to be examined is the same as the model graphic form. Assume that in the model graphic form shown in FIG. 5, a1 to a4 are feature points of the model graphic form and that b1 to b4 in the graphic form to be examined shown in FIG. 6 are feature points of the graphic form to be examined.

Figure 7:
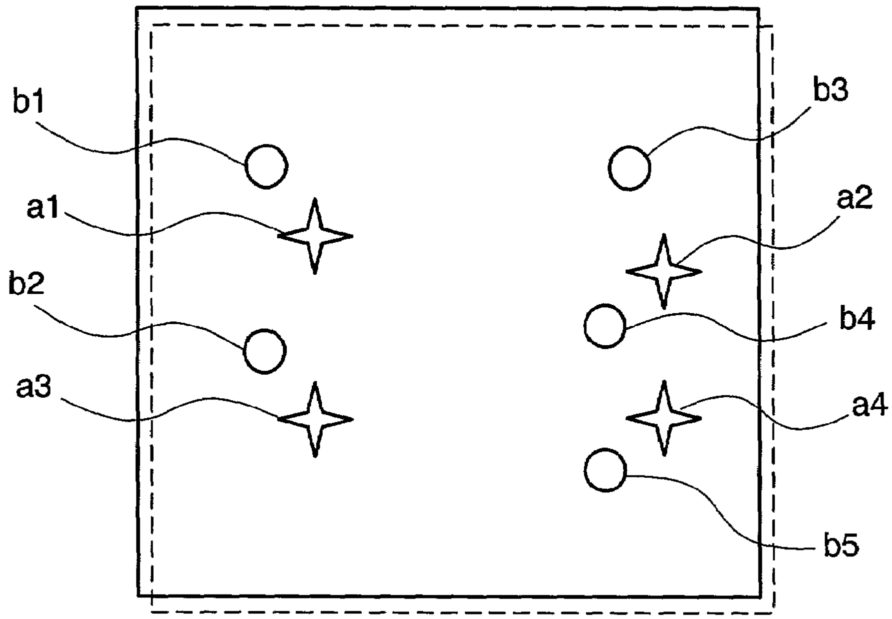
FIG. 7 is a diagram showing a state where the model graphic form and the graphic form to be examined are overlapped with each other according to one embodiment of the present invention.
Figure 8:
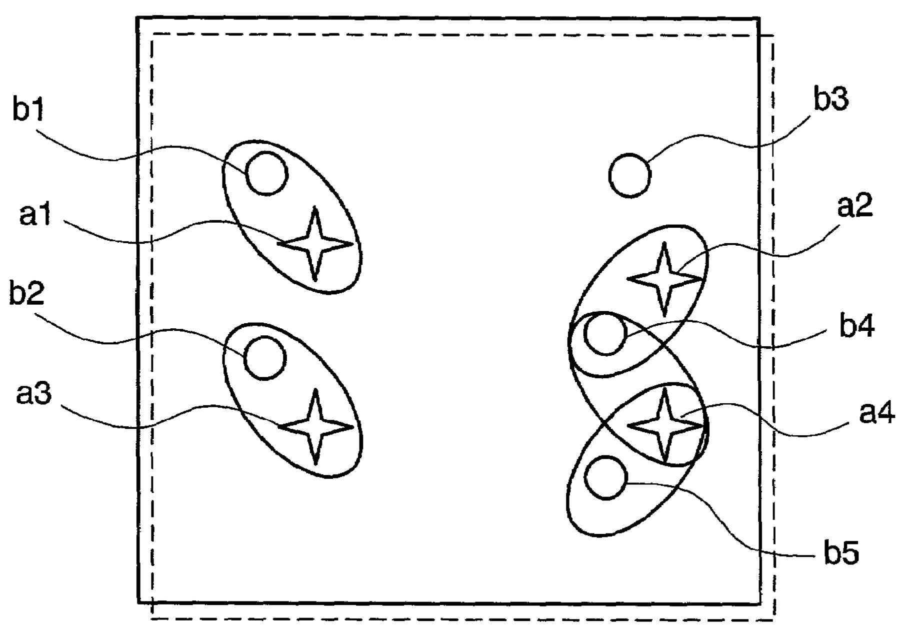
FIG. 8 is a diagram showing feature point pairs in the model graphic form and the graphic form to be examined according to one embodiment of the present invention.

First, overlap the graphic form to be examined and the model graphic form in a manner as illustrated in FIG. 7 to compare the feature points a1 to a4 of the model graphic form and the feature points b1 to b4 of the graphic form to be examined and pair those which can be considered to be the same feature points such as (a1, b1), (a2, b4), (a3, b2), (a4, b4) and (a4, b5). These pairs are illustrated in FIG. 8.

Although taking the fact that the graphic form to be examined is deformed into consideration here, an error to some degree should be expected and there might be a case where a corresponding relationship between feature points can not be completely found, correlate those which seem to be corresponding to each other irrespective of overlap such as (a2, b4), (a4, b4) and (a4, b5). Then, as illustrated in FIG. 4, record a list, a list CL of point pairs for deformation estimation, where these pairs p1:(a1, b1), p2:(a2, b4), p3:(a3, b2), p4:(a4, b4) and p5:(a4, b5) are registered (Step 301).

Here, with coordinates at a feature point of the model graphic form represented as (x, y) and coordinates at a feature point of the graphic form to be examined as (X, Y), assume that the model graphic form as a whole is subjected to uniform elastic deformation as represented by the Mathematical Expression 1 using a 2×2 matrix α and a two-dimensional vector β.

$$\begin{pmatrix} X \\ Y \end{pmatrix} = \alpha \begin{pmatrix} x \\ y \end{pmatrix} + \beta \qquad \text{[expression 1]}$$

Assume that among the pairs p1 to p5 registered at the list of feature point pairs for deformation estimation, a position of a feature point in the model graphic form and a position of a feature point in the graphic form to be examined in an i-th pair pi are (xi, yi) and (Xi, Yi), respectively. When subjected to elastic deformation as shown in the Mathematical Expression 1, the feature point at (xi, yi) on the model graphic form will shift to the position shown by the expression in FIG. 6.

$$\alpha \begin{pmatrix} x_i \\ y_i \end{pmatrix} + \beta \qquad \text{[expression 2]}$$

Difference between the present position and (Xi, Yi), that is, a difference in position from the pair pi when the model graphic form is subjected to the deformation shown by the Mathematical Expression 1 will be ei in the Mathematical Expression 3.

$$\begin{pmatrix} X_i \\ Y_i \end{pmatrix} = \alpha \begin{pmatrix} x_i \\ y_i \end{pmatrix} + \beta + e_i \qquad \text{[expression 3]}$$

A total E of positional differences (square thereof) of the pairs p1 to p5 registered at the list of feature point pairs for deformation estimation is expressed by the following Mathematical Expression 4.

$$E = \sum_i e_i^\top e_i \qquad \text{[expession 4]}$$

Assume that seeking α and β which minimize the total E of the positional differences results in obtaining A and b, respectively. Since a total of differences of the corresponding feature points at this time is the minimum, deformation expressed by the Mathematical Expression 5 which is a formula using A and b will be deformation making points of pairs registered at the list of feature point pairs for deformation estimation be best matched.

$$\begin{pmatrix} X \\ Y \end{pmatrix} = A \begin{pmatrix} x \\ y \end{pmatrix} + b \qquad \text{[expression 5]}$$

Figure 9:
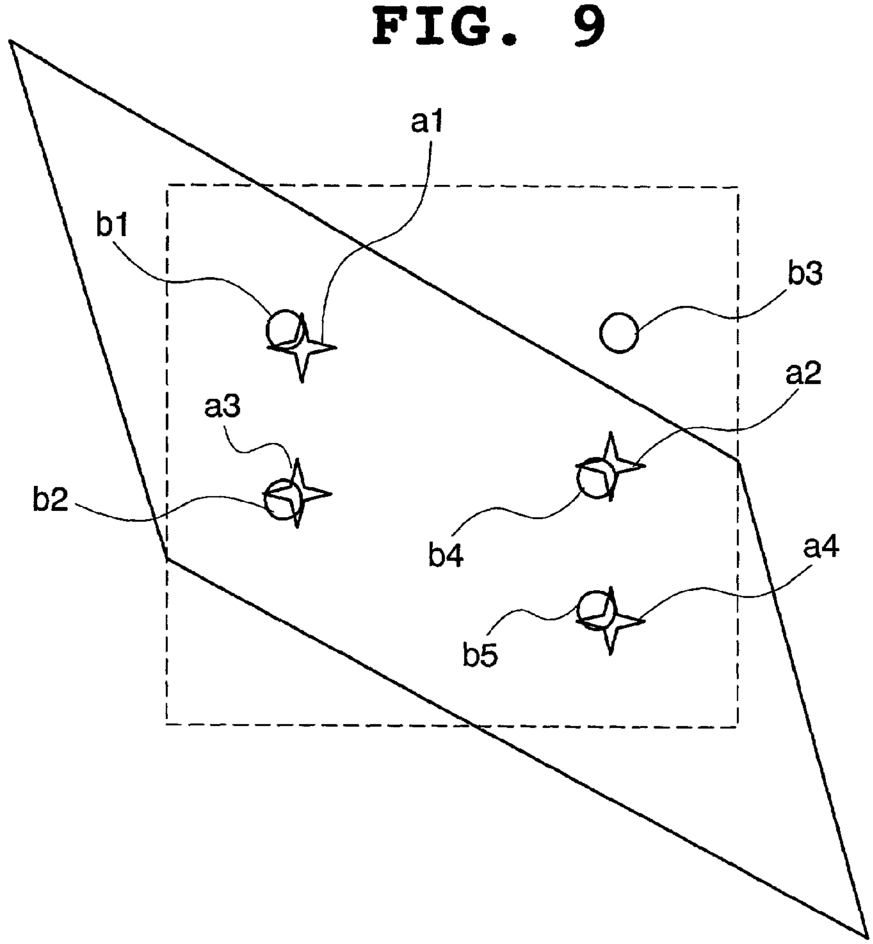
FIG. 9 is a diagram showing a state where a model graphic form subjected to estimated deformation and the graphic form to be examined are overlapped with each other according to one embodiment of the present invention.

Therefore, the deformation generated in the graphic form to be examined can be estimated as that expressed by the Mathematical Expression 5 (Step 302). Result of overlap between the model graphic form subjected to the estimated deformation and the graphic form to be examined is as shown in FIG. 9.

Parameters and energy of the deformation are obtained in a manner as described in the following. The vector b in the Mathematical Expression 5 represents parallel displacement and the matrix A represents contraction/expansion, rotation and shearing. Expressing λ0, λ1 and λ2 as indicated in the Mathematical Expressions 6, 7 and 8, the elastic energy F will be expressed as shown in the Mathematical Expression 9 (in the Mathematical Expression 9, K represents a surrounding compression rate and μ represents a shearing rate, both of which are constants determined by their materials).

$$\lambda_0 = \frac{1}{4}\left\{trA^{\top}A\begin{pmatrix}1 & 0\\ 0 & 1\end{pmatrix} - 2\right\}$$ [expression 6]

$$\lambda_1 = \frac{1}{4}trA^{\top}A\begin{pmatrix}1 & 0\\ 0 & -1\end{pmatrix}$$ [expression 7]

$$\lambda_2 = \frac{1}{4}trA^{\top}A\begin{pmatrix}0 & 1\\ 1 & 0\end{pmatrix}$$ [expression 8]

$$F = 2K\lambda_0^2 + 2\mu(\lambda_1^2 + \lambda_2^2)$$ [expression 9]

Rotation and parallel displacement are simple shift of a position and neither of them contributes elastic energy. λ0 is a parameter corresponding to contraction/expansion (which takes "0" when neither contraction nor expansion is generated, takes a negative value when contraction is generated and takes a positive value when expansion is generated), while λ1 and λ2 are parameters corresponding to shearing distortion (which takes "0" when no distortion is generated and takes a larger absolute value as distortion is enhanced).

When the here obtained parameters such as elastic energy and elastic deformation are too large for the deformation estimated for the graphic form to be examined, the deformation is inappropriate as deformation to be generated in the graphic form to be examined, whereby deformation will be again estimated (Step 303).

In a case, for example, where a graphic form as an object of examination is a fingerprint, a palmprint or the like, because the examination target is not such a highly extensible substance as rubber, contraction/expansion is limited. Therefore, when λ0 exceeds a range of possible contraction/expansion which is predetermined for a finger, abandon the estimation. In addition, since distortion of a fingerprint, a palmprint and the like is also limited, when λ1 or λ2 exceeds a possible range of distortion for a fingerprint or a palmprint, abandon the estimation as well. Also as to elastic energy itself, when it fails to fall within an assumed range for a fingerprint or a palmprint, abandon the estimation.

Possible processing to be conducted subsequently when estimation is abandoned are processing of changing a deformation model, processing of executing estimation of deformation again after changing a method of creating a list of feature point pairs for deformation estimation and other processing.

Here, description will be made of an example of changing a deformation model.

Assume, for example, that a finger is a rigid body on which severer constrain is placed than that on an elastic body, consideration will be given to a deformation model of the rigid body (because a rigid body will not be deformed, the model includes only the parameters of parallel displacement and rotation). First, assuming that the model is a rigid body, convert a model graphic form and a graphic form to be examined such that a difference in position between paired feature points of each of the graphic forms becomes smaller. Overlap of the model graphic form and the graphic form to be examined based on the conversion result is as illustrated in FIG. 10.

Figure 10:
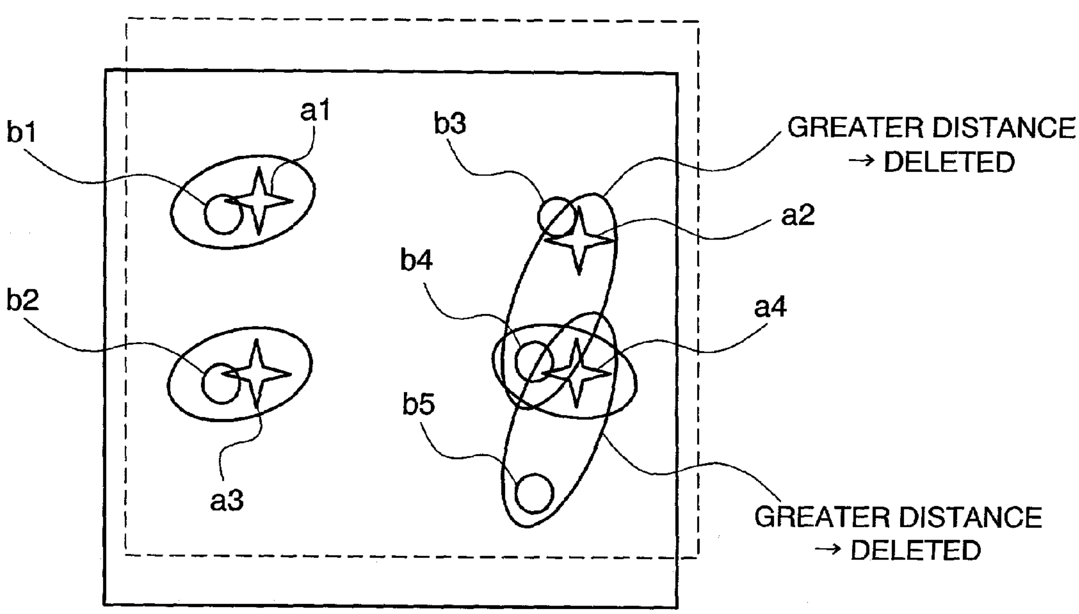
FIG. 10 is a diagram showing a state where the model graphic form shifted and the graphic form to be examined are overlapped with each other according to one embodiment of the present invention.
Figure 11:
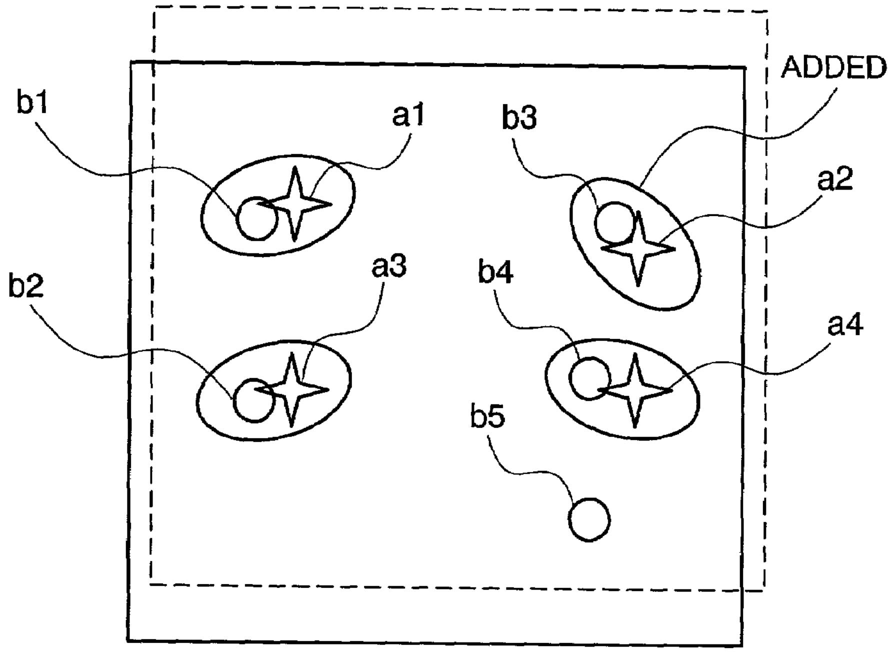
FIG. 11 is a diagram showing feature point pairs in the shifted model graphic form and the graphic form to be examined according to one embodiment of the present invention.

Next, since in FIG. 10, a distance between paired feature points p2:(a2, b4) and p5:(a4, b5) registered in the list of feature point pairs for deformation estimation will be increased after deformation, delete the pairs from the list of feature point pairs for deformation estimation. In addition, as illustrated in FIG. 11, since (a2, b3) come closer to each other after deformation, additionally register the pair at the list of feature point pairs for deformation estimation to make the list of feature point pairs for deformation estimation include p1:(a1, b1), p3:(a3, b2), p4:(a4, b4) and p6:(a2, b3).

Figure 12:
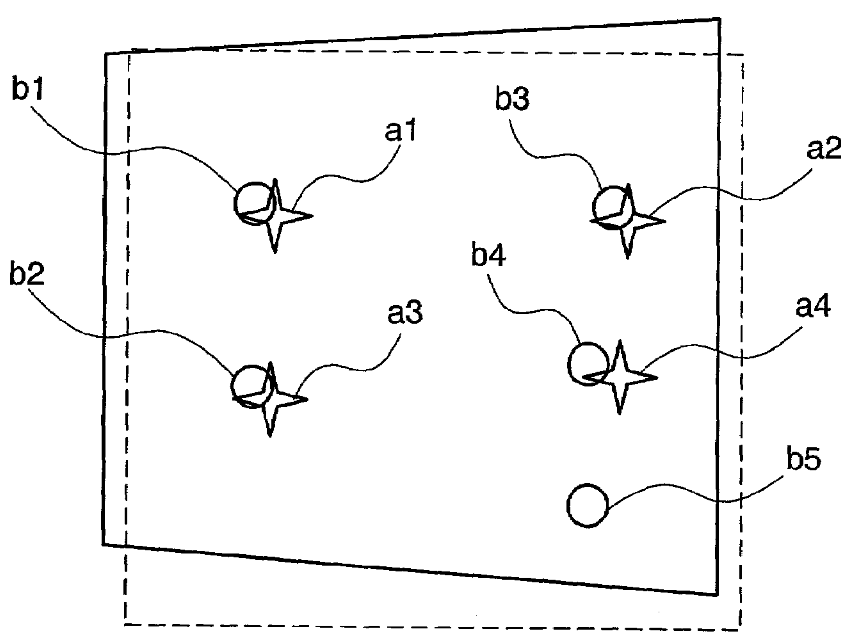
FIG. 12 is a diagram showing a state where the model graphic form subjected to estimated deformation and the graphic form to be examined are overlapped with each other according to one embodiment of the present invention.

While it is possible to end estimation processing here, it is also possible to conduct estimation again with respect to an elastic deformation model more similar to an actual finger which is used at first as a deformation model of a finger. FIG. 12 is a diagram showing the graphic forms subjected to elastic deformation estimated using the modified list of feature point pairs for deformation estimation including p1:(a1, b1), p3:(a3, b2), p4: (a4, b4) and p6:(a2, b3).

By thus repeating each processing of pair selection, deformation estimation and deformation verification, appropriateness of selection of a feature point pair is gradually increased to estimate a pair of properly corresponding feature points and deformation generated in the graphic form to be examined.

Upon estimation of deformation, by subjecting the feature point (X, Y) of the graphic form to be examined to inversion of the formula of the Mathematical Expression 5 which inversion is represented by the formula of the Mathematical Expression 10, the deformation will be corrected to convert the feature point to coordinates (x, y) of a feature point which can be directly compared with the model graphic form, so that by the comparison between the graphic form to be examined whose deformation has been corrected and the model graphic form, similarity between the graphic form to be examined and the model graphic form is calculated to determine whether the graphic form to be examined and the model graphic form are the same graphic form or not.

$$\begin{pmatrix}x\\ y\end{pmatrix} = A^{-1}\left\{\begin{pmatrix}X\\ Y\end{pmatrix} - b\right\}$$ [expression 10]

It is also possible to narrow down feature point pairs registered at the above-described list of feature point pairs for deformation estimation to those more reliable by deleting a pair of feature points which will go apart from each other by a distance greater than a predetermined threshold value when subjected to estimated deformation from the list of feature point pairs for deformation estimation and repeating estimation a predetermined number of times or until no further feature point pair to be deleted exists.

As described in the foregoing, since according to the present embodiment, deformation generated in a graphic form to be examined is estimated to correct the deformation and the graphic form to be examined whose deformation has been corrected and the model graphic form are compared to collate the two graphic forms, even when the graphic form to be examined has deformation (or when deformation of the graphic form to be examined is different from that of the model graphic form), the graphic form to be examined and the model graphic form can be strictly discriminated and collated with each other.

Next, a second embodiment of the present invention will be described in detail with reference to the drawings.

Figure 13:
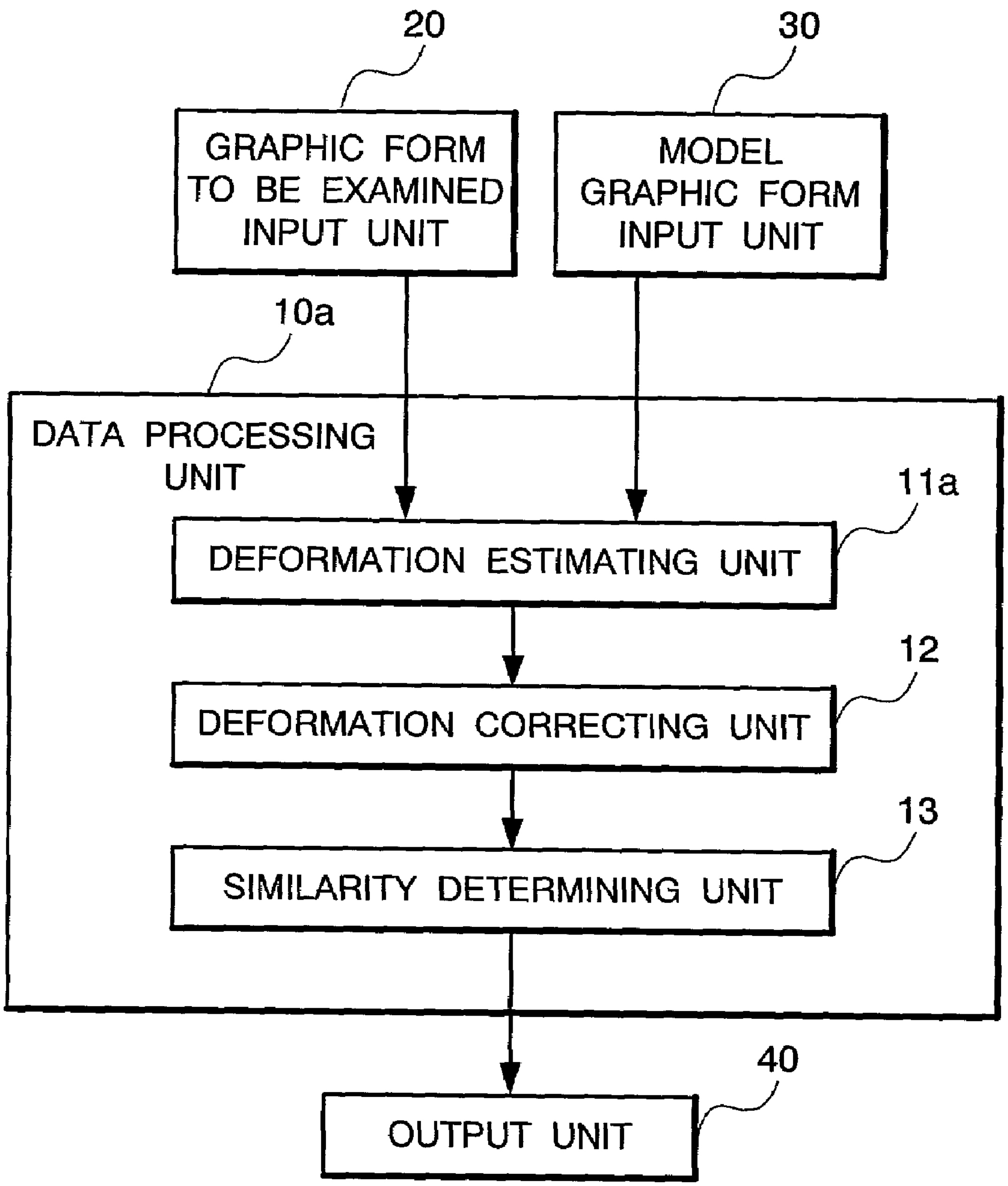
FIG. 13 is a block diagram showing a structure of a pattern collation device according to a second embodiment of the present invention.
Figure 14:
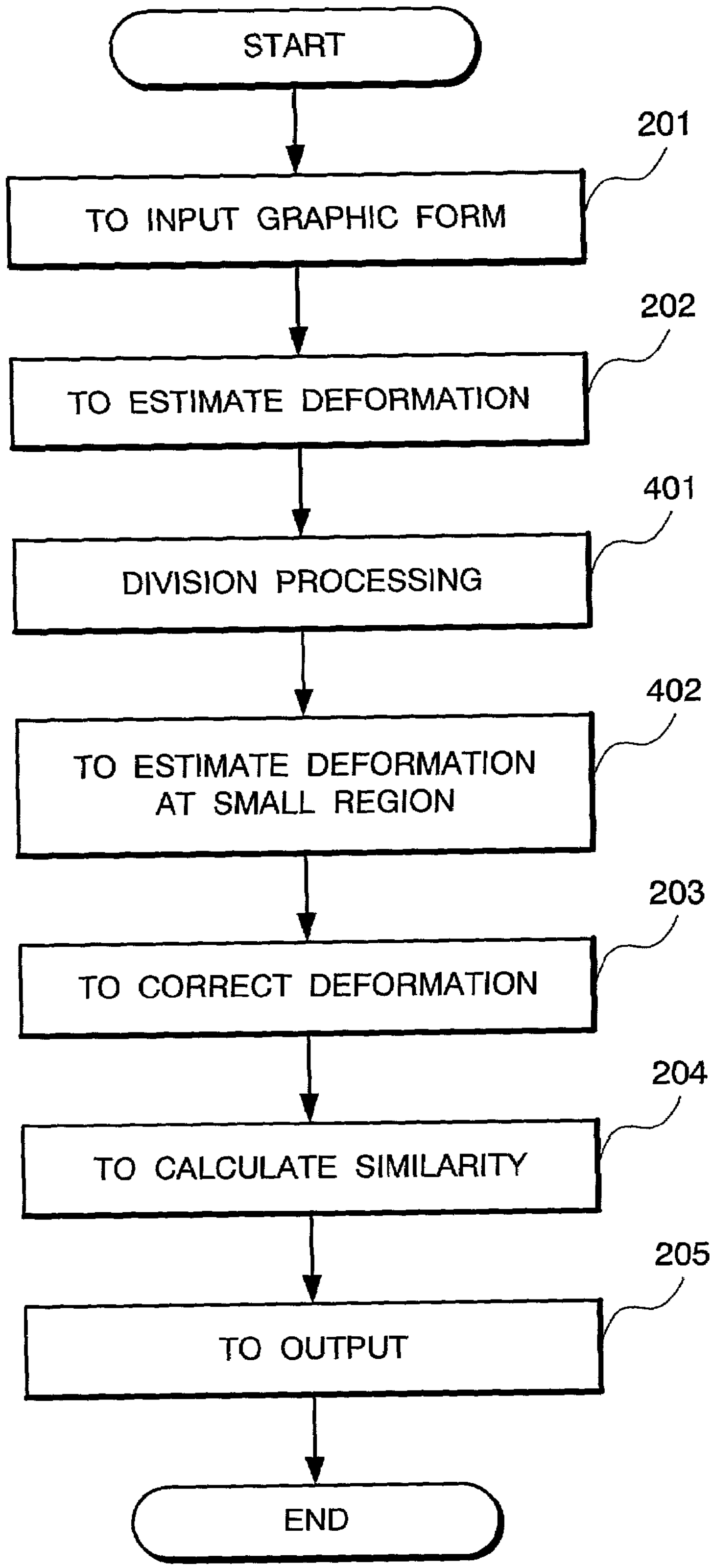
FIG. 14 is a flow chart for use in explaining processing of pattern collation according to the second embodiment of the present invention.

FIG. 13 is a block diagram showing a structure of a pattern collation device according to the present embodiment, while FIG. 14 is a flow chart for use in explaining processing of pattern collation according to the present embodiment.

As illustrated in FIGS. 13 and 14, the present embodiment differs from the first embodiment in the function of a deformation estimating unit 11*a* in a data processing unit 10*a*. Pattern collation processing of the present embodiment is the same as that of the first embodiment with the only difference being that new Steps 401 and 402 are added after Step 202.

In the deformation estimation processing according to the present embodiment shown in FIG. 14, first, the same processing as the deformation estimating processing of the first embodiment is executed to estimate deformation generated in the graphic form to be examined as a whole (Step 202). Next, divide the graphic form into predetermined small regions (Step 401) and conduct deformation estimation processing on a region basis in the same manner as that of Step 202 to estimate deformation at each region (Step 402).

Here, in a case where based on the deformation estimation result of each small region, the small region can not be assumed to singly have peculiar deformation in consideration of nature of an object of examination (as in Step 303 of the first embodiment), appropriateness of the estimation may be verified. It is for example possible, after estimating deformation of each small region, to evaluate appropriateness of the estimation by evaluating a relationship with deformation estimated with respect to a nearby region or a relationship with deformation estimated with respect to the whole region and when inappropriate deformation is being estimated, try estimation again.

Also possible is to sequentially repeat estimation processing with a target region area reduced after estimating deformation generated in the graphic form to be examined as a whole. When applied to fingerprint recognition, for example, there occurs a case where force is applied to a part of a finger at the time of fingerprinting to result in that each part has a different manner of deformation. In such a case, the processing of Steps 401 and 402 of the present embodiment enables estimation of deformation of each part.

As described in the foregoing, in addition to the effect attained by the first embodiment, the present embodiment has an effect of coping with a graphic form whose deformation manner differs in each part, thereby reducing a possibility of erroneous estimation of deformation.

Next, a third embodiment of the present invention will be described in detail with reference to the drawings.

Figure 15:
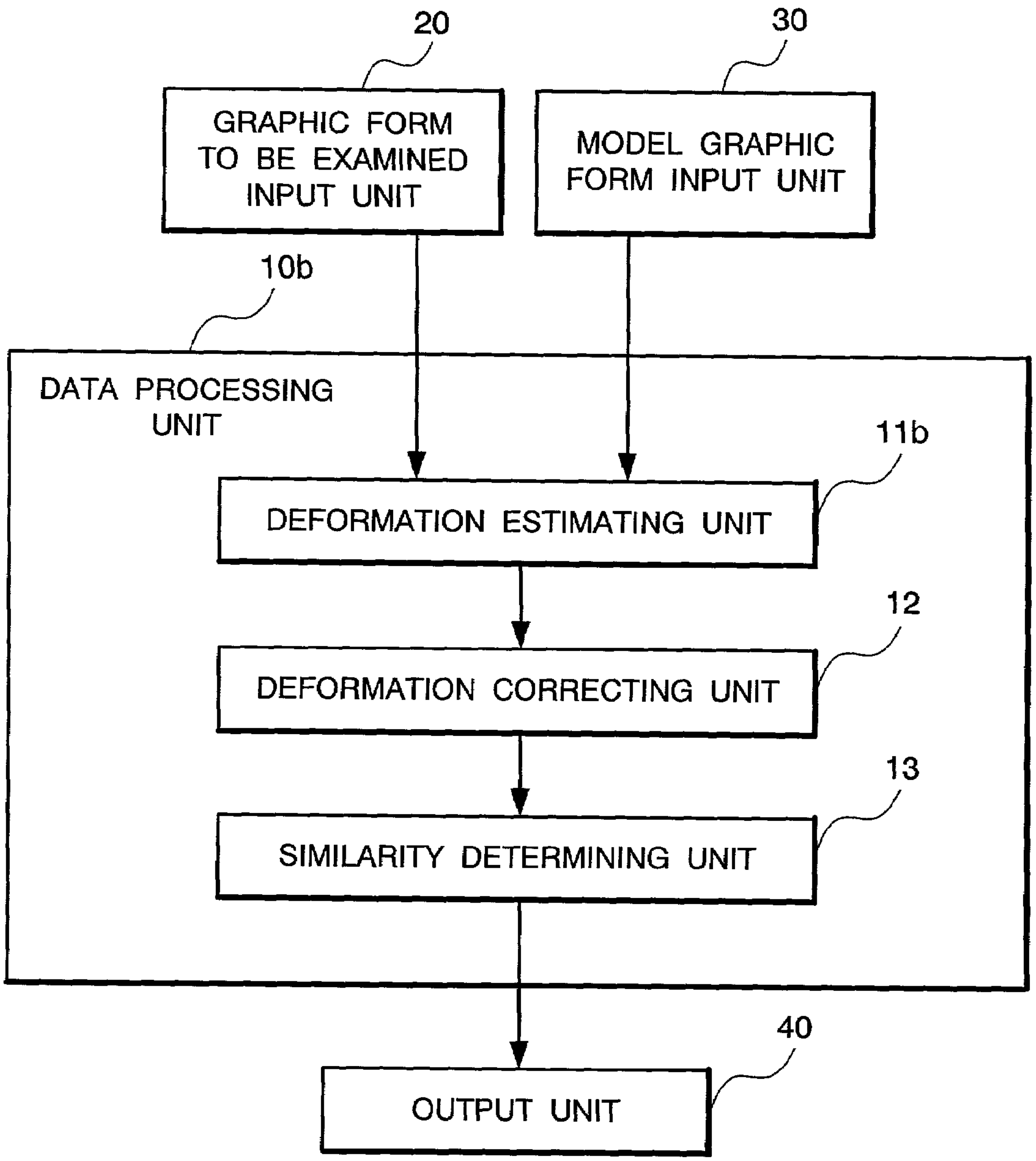
FIG. 15 is a block diagram showing a structure of a pattern collation device according to a third embodiment of the present invention.
Figure 16:
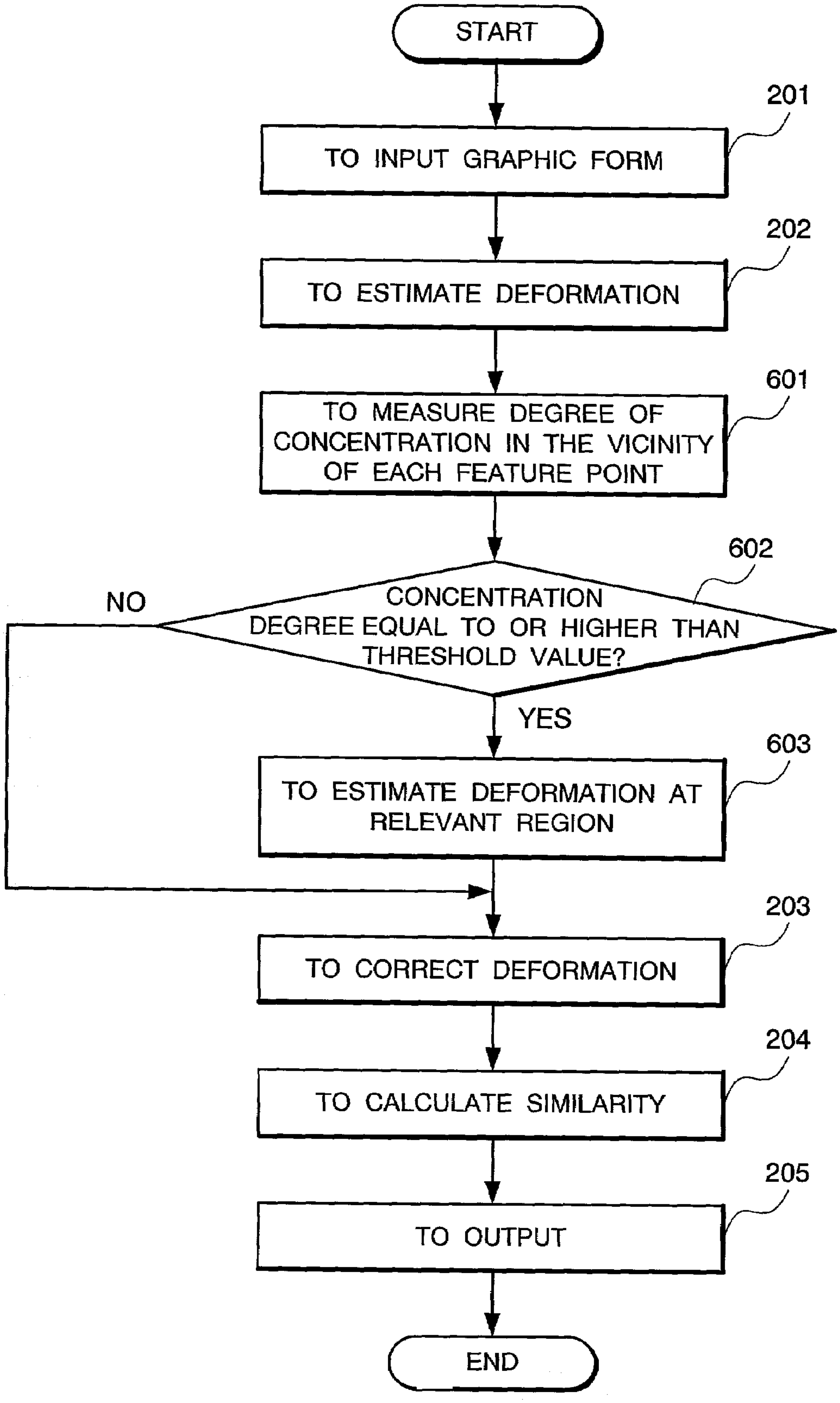
FIG. 16 is a flow chart for use in explaining processing of pattern collation according to the third embodiment of the present invention.

FIG. 15 is a block diagram showing a structure of a pattern collation device according to the present embodiment, while FIG. 16 is a flow chart for use in explaining processing of pattern collation according to the present embodiment.

As illustrated in FIGS. 15 and 16, the present embodiment differs from the first embodiment in the function of a deformation estimating unit 11*b* in a data processing unit 10*b*. Pattern collation processing of the present embodiment is the same as that of the first embodiment with the only difference being that Steps 601, 602 and 603 are newly added to Step 202.

Figure 17:
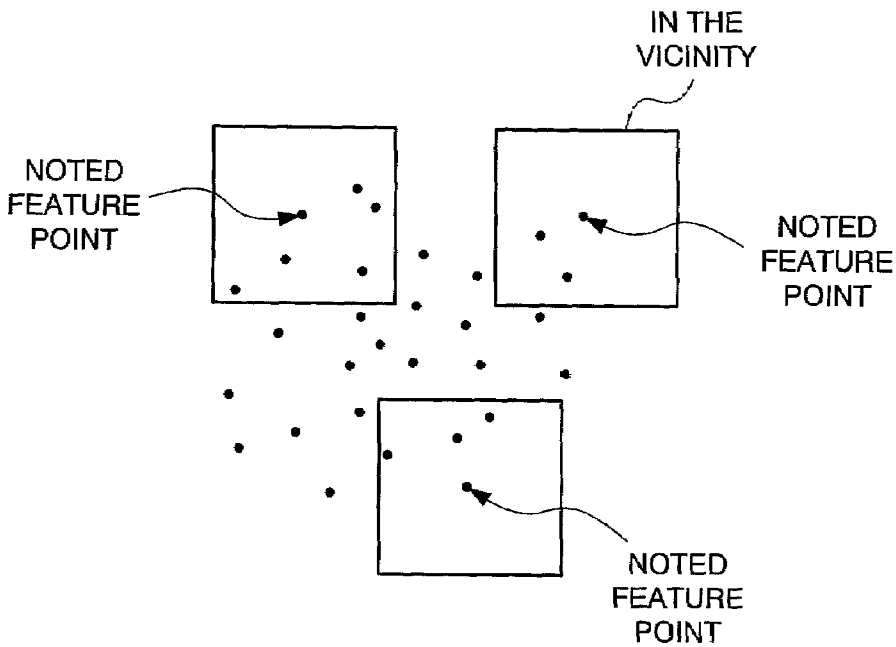
FIG. 17 is a diagram for use in explaining measurement of a degree of concentration of feature points in the vicinity of a feature point in the third embodiment of the present invention.

In the deformation estimation processing according to the present embodiment shown in FIG. 16, first, execute the same processing as the deformation estimating processing of the first embodiment to estimate deformation generated in the graphic form to be examined as a whole (Step 202). Next, measure a degree of concentration of feature points in the vicinity of an arbitrary feature point (Step 601). As illustrated in FIG. 17, this is the processing of, with a region of a predetermined size around a noted arbitrary feature point set to be a vicinity of the noted feature point, measuring a degree of concentration of feature points in the vicinity of the point.

Then, when there exist feature point pairs as many as or more than the number of a predetermined threshold value (Step 602), by applying the same deformation estimating processing as that of Step 202 to the vicinity, estimate deformation in the vicinity of the feature point from nearby feature point pairs (Step 603).

By thus partially executing deformation estimating processing at a part where feature points concentrate, the present embodiment copes with a graphic form whose deformation manner varies with each part, thereby reducing a possibility of erroneous deformation estimation.

In addition, when feature point pairs fail to exist as many as or more than the number of the predetermined threshold value in the vicinity of feature point (Step 602), no processing of estimating deformation in the vicinity is necessary and deformation estimated for the graphic form to be examined as a whole at Step 202 is used.

Then, based on the deformation estimation made at Steps 202 and 603, deform the graphic form to be examined (or model graphic form) (Step 203) to calculate similarity between the two graphic forms (Step 204).

According to the present embodiment, deformation is estimated at each feature point to evaluate a relationship with deformation estimated in the vicinity of the feature point or a relationship with deformation estimated as a whole, thereby evaluating appropriateness of the estimation (as is done at Step 303 of the first embodiment) and when inappropriate deformation is estimated, the estimation can be tried again.

As described in the foregoing, in addition to the effect attained by the first embodiment, the present invention has an effect of coping with a graphic form whose deformation manner varies with each part, thereby reducing a possibility of erroneous deformation estimation.

Moreover, the above-described deformation estimating processing in the second and third embodiments can be implemented in combination.

In the pattern collation devices according to the above-described respective embodiments, the functions of the data processing units 10, 10*a* and 10*b*, the deformation estimating unit 11, the deformation estimating unit 11*a*, the deformation estimating unit 11*b*, the deformation correcting unit 12, the similarity determining unit 13 and the like and other functions can be realized not only by hardware but also by loading a pattern collation program which is a computer program having the respective functions into a memory of a computer processing device.

Figure 18:
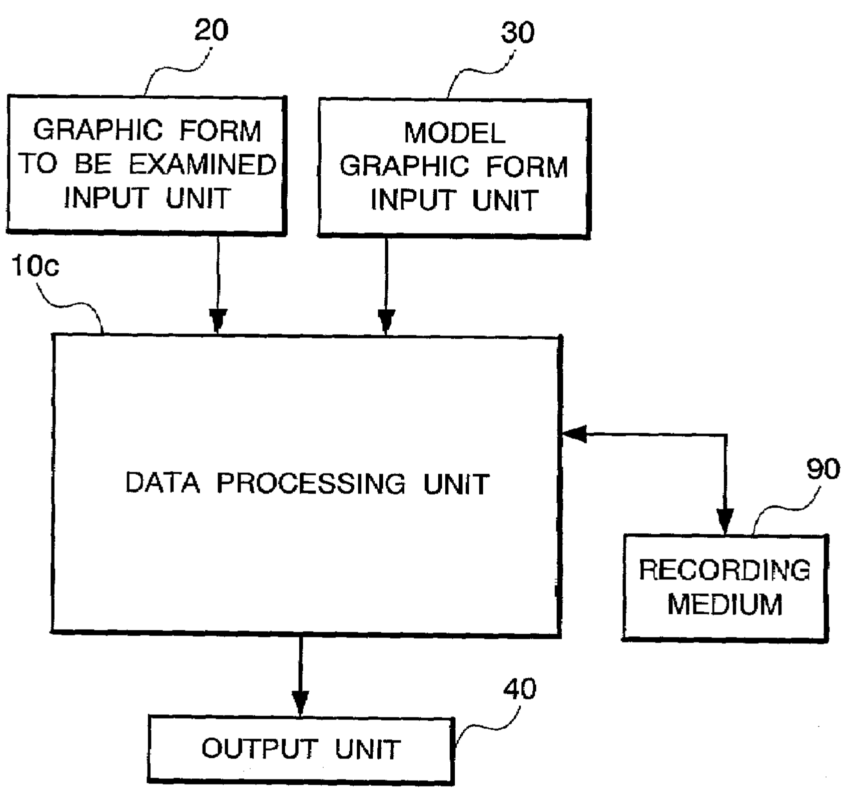
FIG. 18 is a diagram showing one embodiment of a structure of a device having a recording medium in which a pattern collation program is stored according to the present invention.

FIG. 18 is a diagram showing one embodiment of a structure having a recording medium in which a pattern collation program is recorded according to the present invention.

The pattern collation program is stored in a recording medium 90 such as a magnetic disc or a semiconductor memory. Then, loading the program into a data processing unit 10*c* which is a computer processing device from the recording medium to control operation of the data processing unit 10*c* realizes the above-described functions. As a result, the data processing unit 10*c* executes the processing conducted by the data processing units 10, 10*a* and 10*b* in the first, second and third embodiments under the control of the pattern collation program.

Although the present invention has been described with respect to the preferred modes of implementation and embodiments, the present invention is not necessarily limited to the above-described modes and embodiments but realized in various forms within a scope of its technical ideas.

As described in the foregoing, the pattern collation device of the present invention attains the following effects.

First, according to the present invention, since deformation generated in a graphic form to be examined is estimated and corrected, the graphic form to the examined can be correctly identified even when the form is deformed. Moreover, the present invention enables a change of a feature quantity caused by deformation and an error of extraction of a feature quantity to be separated to realize accurate comparison of feature quantities.

Secondly, according to the second embodiment of the present invention, by dividing a graphic form to be examined into small regions and estimating deformation at each small region, the graphic form to be examined can be correctly discriminated even when the form partly has different deformation.

Thirdly, according to the third embodiment of the present invention, when the number of nearby feature point pairs existing in a graphic form to be examined is more than a predetermined number, deformation around the feature points is estimated to reduce deformation estimation errors, so that even when the graphic form to be examined partly has different deformation, it can be discriminated correctly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A pattern collation device for comparing and collating a graphic form to be examined and a model graphic form as a graphic form based on which comparison is made, comprising:

deformation estimating means for estimating deformation generated in a graphic form to be examined which is a graphic form as an object of examination based on information about a feature point indicative of features in each of the graphic form to be examined in question and a model graphic form as a graphic form based on which comparison is made, and deformation correcting means for correcting the graphic form to be examined in question based on information about the deformation estimated by said deformation estimating means, wherein said deformation estimating means correlates and pairs feature points in each of said graphic form to be examined and said model graphic form between which a difference in feature quantity indicative of a degree of features at said feature point is small and determines the contents of deformation of said graphic form to be examined which best match correspondences between said respective feature points to estimate deformation generated in the graphic form to be examined in question.

2. The pattern collation device as set forth in claim 1, wherein said deformation estimating means selects the contents of deformation of said graphic form to be examined which best match correspondences between said respective feature points in each of said graphic form to be examined and said model graphic form from a plurality of deformation models indicative of the contents of deformation of image data which are prepared in advance.

3. The pattern collation device as set forth in claim 1, wherein said deformation estimating means has information of a deformation model indicative of the contents of deformation of image data corresponding to a value designated by an individual parameter, and determines the contents of deformation of said graphic form to be examined by obtaining a value of each said parameter which provides said deformation model that best matches correspondences between said respective feature points in each of said graphic form to be examined and said model graphic form.

4. The pattern collation device as set forth in claim 1, wherein said deformation estimating means re-estimates deformation using only feature point pairs left after excluding said paired feature points which go apart from each other by a distance equal to or greater than a predetermined threshold value when subjected to estimated deformation.

5. The pattern collation device as set forth in claim 1, wherein said deformation estimating means changes the deformation model in question to re-estimate deformation when the scale of estimated deformation is larger than a predetermined threshold value.

6. The pattern collation device as set forth in claim 1, wherein said deformation estimating means, after estimating deformation of said graphic form to be examined as a whole, divides the graphic form to be examined in question into small regions to estimate the contents of deformation at each said small region.

7. The pattern collation device as set forth in claim 1, wherein said deformation estimating means, after estimating deformation of said graphic form to be examined as a whole, refers, with respect to each feature point pair in question, to information of said feature point pairs in the vicinity to estimate and correct deformation in the vicinity of each said feature point pair.

8. The pattern collation device as set forth in claim 1, wherein as said deformation model, elastic deformation is used and as data indicative of the scale of deformation, elastic energy is used.

9. The pattern collation device as set forth in claim 8, wherein as said graphic form to be examined and said model graphic form, at least either a fingerprint image or a palmprint image is used.

10. A deformation correcting device for comparing a graphic form to be examined and a model graphic form as a graphic form based on which comparison is made to correct deformation, comprising:

deformation estimating means for estimating deformation generated in a graphic form to be examined which is a graphic form as an object of examination based on information about a feature point indicative of features in each of the graphic form to be examined in question and a model graphic form as a graphic form based on which comparison is made, and deformation correcting means for correcting the graphic form to be examined in question based on information about the deformation estimated by said deformation estimating means, wherein said deformation estimating means correlates and pairs feature points in each of said graphic form to be examined and said model graphic form between which a difference in feature quantity indicative of a degree of features at said feature point is small and determines the contents of deformation of said graphic form to be examined which best match correspondences between said respective feature points to estimate deformation generated in the graphic form to be examined in question.

11. The deformation correcting device as set forth in claim 10, wherein said deformation estimating means selects the contents of deformation of said graphic form to be examined which best match correspondences between said respective feature points in each of said graphic form to be examined and said model graphic form from a plurality of deformation models indicative of the contents of deformation of image data which are prepared in advance.

12. The deformation correcting device as set forth in claim 10, wherein said deformation estimating means has information of a deformation model indicative of the contents of deformation of image data corresponding to a value designated by an individual parameter, and determines the contents of deformation of said graphic form to be examined by obtaining a value of each said parameter which provides said deformation model that best matches correspondences between said respective feature points in each of said graphic form to be examined and said model graphic form.

13. The deformation correcting device as set forth in claim 10, wherein said deformation estimating means re-estimates deformation using only feature point pairs left after excluding said paired feature points which go apart from each other by a distance equal to or greater than a predetermined threshold value when subjected to estimated deformation.

14. The deformation correcting device as set forth in claim 10, wherein said deformation estimating means changes the deformation model in question to re-estimate deformation when the scale of estimated deformation is larger than a predetermined threshold value.

15. The deformation correcting device as set forth in claim 10, wherein said deformation estimating means, after estimating deformation of said graphic form to be examined as a whole, divides the graphic form to be examined in question into small regions to estimate the contents of deformation at each said small region.

16. The deformation correcting device as set forth in claim 10, wherein said deformation estimating means, after estimating deformation of said graphic form to be examined as a whole, refers, with respect to each feature point pair in question, to information of said feature point pairs in the vicinity to estimate and correct deformation in the vicinity of each said feature point pair.

17. The deformation correcting device as set forth in claim 10, wherein as said deformation model, elastic deformation is used and as data indicative of the scale of deformation, elastic energy is used.

18. The deformation correcting device as set forth in claim 17, wherein as said graphic form to be examined and said model graphic form, at least either a fingerprint image or a palmprint image is used.

19. A pattern collating method of comparing and collating a graphic form to be examined and a model graphic form as a graphic form based on which comparison is made, comprising the steps of:

the deformation estimating step of estimating deformation generated in a graphic form to be examined which is a graphic form as an object of examination based on information about a feature point indicative of features in each of the graphic form to be examined in question and a model graphic form as a graphic form based on which comparison is made, and the deformation correcting step of correcting the graphic form to be examined in question based on information about said estimated deformation, wherein at said deformation estimating step, feature points in each of said graphic form to be examined and said model graphic form between which a difference in feature quantity indicative of a degree of features at said feature point is small are correlated and paired to determine the contents of deformation of said graphic form to be examined which best match correspondences between said respective feature points, thereby estimating deformation generated in the graphic form to be examined in question.

20. The pattern collating method as set forth in claim 19, wherein at said deformation estimating step, the contents of deformation of said graphic form to be examined which best match correspondences between said respective feature points in each of said graphic form to be examined and said model graphic form are selected from a plurality of deformation models indicative of the contents of deformation of image data which are prepared in advance.

21. The pattern collating method as set forth in claim 19, wherein at said deformation estimating step, based on information of a deformation model indicative of the contents of deformation of image data corresponding to a value designated by an individual parameter, the contents of deformation of said graphic form to be examined are determined by obtaining a value of each said parameter which provides said deformation model that best matches correspondences between said respective feature points in each of said graphic form to be examined and said model graphic form.

22. The pattern collating method as set forth in claim 19, wherein at said deformation estimating step, deformation is re-estimated using only feature point pairs left after excluding said paired feature points which go apart from each other by a distance equal to or greater than a predetermined threshold value when subjected to estimated deformation.

23. The pattern collating method as set forth in claim 19, wherein at said deformation estimating step, the deformation model in question is changed to re-estimate deformation when the scale of estimated deformation is larger than a predetermined threshold value.

24. The pattern collating method as set forth in claim 19, wherein at said deformation estimating step, after estimating deformation of said graphic form to be examined as a whole, the graphic form to be examined in question is divided into small regions to estimate the contents of deformation at each said small region.

25. The pattern collating method as set forth in claim 21, wherein at said deformation estimating step, after estimating deformation of said graphic form to be examined as a whole, with respect to each feature point pair in question, deformation in the vicinity of each said feature point pair is estimated and corrected by referring to information of said feature point pairs in the vicinity.

26. The pattern collating method as set forth in claim 19, wherein as said deformation model, elastic deformation is used and as data indicative of the scale of deformation, elastic energy is used.

27. The pattern collating method as set forth in claim 26, wherein as said graphic form to be examined and said model graphic form, at least either a fingerprint image or a palmprint image is used.

28. A pattern collation program stored on a computer readable medium for comparing and collating a graphic form to be examined and a model graphic form as a graphic form based on which comparison is made by controlling a computer, the program comprising instructions for performing:

a deformation estimating function of estimating deformation generated in a graphic form to be examined which is a graphic form as an object of examination based on information about a feature point indicative of features in each of the graphic form to be examined in question and a model graphic form as a graphic form based on which comparison is made, and a deformation correcting function of correcting the graphic form to be examined in question based on information about said estimated deformation, wherein said deformation estimating function executes processing of estimating deformation generated in the graphic form to be examined in question by correlating and pairing feature points in each of said graphic form to be examined and said model graphic form between which a difference in feature quantity indicative of a degree of features at said feature point is small to determine the contents of deformation of said graphic form to be examined which best match correspondences between said respective feature points.

29. The pattern collation program as set forth in claim 28, wherein said deformation estimating function executes processing of selecting the contents of deformation of said graphic form to be examined which best match correspondences between said respective feature points in each of said graphic form to be examined and said model graphic form from a plurality of deformation models indicative of the contents of deformation of image data which are prepared in advance.

30. The pattern collation program as set forth in claim 28, wherein said deformation estimating function executes, based on information of a deformation model indicative of the contents of deformation of image data corresponding to a value designated by an individual parameter, processing of determining the contents of deformation of said graphic form to be examined by obtaining a value of each said parameter which provides said deformation model that best matches correspondences between said respective feature points in each of said graphic form to be examined and said model graphic form.

31. The pattern collation program as set forth in claim 28, wherein said deformation estimating function executes processing of re-estimating deformation using only feature point pairs left after excluding said paired feature points which go apart from each other by a distance equal to or greater than a predetermined threshold value when subjected to estimated deformation.

32. The pattern collation program as set forth in claim 28, wherein said deformation estimating function executes processing of changing the deformation model in question to re-estimate deformation when the scale of estimated deformation is larger than a predetermined threshold value.

33. The pattern collation program as set forth in claim 28, wherein said deformation estimating function executes, after estimating deformation of said graphic form to be examined as a whole, processing of dividing the graphic form to be examined in question into small regions to estimate the contents of deformation at each said small region.

34. The pattern collation program as set forth in claim 28, wherein said deformation estimating function executes, after estimating deformation of said graphic form to be examined as a whole, processing of referring to, with respect to each feature point pair in question, information of said feature point pairs in the vicinity to estimate and correct deformation in the vicinity of each said feature point pair.

35. A deformation correcting method of comparing a graphic form to be examined and a model graphic form as a graphic form based on which comparison is made to correct deformation, comprising the steps of:

the deformation estimating step of estimating deformation generated in a graphic form to be examined which is a graphic form as an object of examination based on information about a feature point indicative of features in each of the graphic form to be examined in question and a model graphic form as a graphic form based on which comparison is made, and the deformation correcting step of correcting the graphic form to be examined based on information about said estimated deformation, wherein at said deformation estimating step, feature points in each of said graphic form to be examined and said model graphic form between which a difference in feature quantity indicative of a degree of features at said feature point is small are correlated and paired to determine the contents of deformation of said graphic form to be examined which best match correspondences between said respective feature points, thereby estimating deformation generated in the graphic form to be examined in question.

36. The deformation correcting method as set forth in claim 35, wherein at said deformation estimating step, the contents of deformation of said graphic form to be examined which best match correspondences between said respective feature points in each of said graphic form to be examined and said model graphic form are selected from a plurality of deformation models indicative of the contents of deformation of image data which are prepared in advance.

37. The deformation correcting method as set forth in claim 35, wherein at said deformation estimating step, based on information of a deformation model indicative of the contents of deformation of image data corresponding to a value designated by an individual parameter, the contents of deformation of said graphic form to be examined are determined by obtaining a value of each said parameter which provides said deformation model that best matches correspondences between said respective feature points in each of said graphic form to be examined and said model graphic form.

38. The deformation correcting method as set forth in claim 35, wherein at said deformation estimating step, deformation is re-estimated using only feature point pairs left after excluding said paired feature points which go apart from each other by a distance equal to or greater than a predetermined threshold value when subjected to estimated deformation.

39. The deformation correcting method as set forth in claim 35, wherein at said deformation estimating step, the deformation model in question is changed to re-estimate deformation when the scale of estimated deformation is larger than a predetermined threshold value.

40. The deformation correcting method as set forth in claim 35, wherein at said deformation estimating step, after estimating deformation of said graphic form to be examined as a whole, the graphic form to be examined in question is divided into small regions to estimate the contents of deformation at each said small region.

41. The deformation correcting method as set forth in claim 35, wherein at said deformation estimating step, after estimating deformation of said graphic form to be examined as a whole, with respect to each feature point pair in question, deformation in the vicinity of each said feature point pair is estimated and corrected by referring to information of said feature point pairs in the vicinity.

42. The deformation correcting method as set forth in claim 35, wherein as said deformation model, elastic deformation is used and as data indicative of the scale of deformation, elastic energy is used.

43. The deformation correcting method as set forth in claim 42, wherein as said graphic form to be examined and said model graphic form, at least either a fingerprint image or a palmprint image is used.

44. A deformation correction program stored on a computer readable medium for comparing a graphic form to be examined and a model graphic form as a graphic form based on which comparison is made to correct deformation by controlling a computer, the program comprising instructions for performing:

a deformation estimating function of estimating deformation generated in a graphic form to be examined which is a graphic form as an object of examination based on information about a feature point indicative of features in each of the graphic form to be examined in question and a model graphic form as a graphic form based on which comparison is made, and a deformation correcting function of correcting the graphic form to be examined in question based on information about said estimated deformation, wherein said deformation estimating function executes processing of estimating deformation generated in the graphic form to be examined in question by correlating and pairing feature points in each of said graphic form to be examined and said model graphic form between which a difference in feature quantity indicative of a degree of features at said feature point is small to determine the contents of deformation of said graphic form to be examined which best match correspondences between said respective feature points.

45. The deformation correction program as set forth in claim 44, wherein said deformation estimating function executes processing of selecting the contents of deformation of said graphic form to be examined which best match correspondences between said respective feature points in each of said graphic form to be examined and said model graphic form from a plurality of deformation models indicative of the contents of deformation of image data which are prepared in advance.

46. The deformation correction program as set forth in claim 44, wherein said deformation estimating function executes, based on information of a deformation model indicative of the contents of deformation of image data corresponding to a value designated by an individual parameter, processing of determining the contents of deformation of said graphic form to be examined by obtaining a value of each said parameter which provides said deformation model that best matches correspondences between said respective feature points in each of said graphic form to be examined and said model graphic form.

47. The deformation correction program as set forth in claim 44, wherein said deformation estimating function executes processing of re-estimating deformation using only feature point pairs left after excluding said paired feature points which go apart from each other by a distance equal to or greater than a predetermined threshold value when subjected to estimated deformation.

48. The deformation correction program as set forth in claim 44, wherein said deformation estimating function executes processing of changing the deformation model in question to re-estimate deformation when the scale of estimated deformation is larger than a predetermined threshold value.

49. The deformation correction program as set forth in claim 44, wherein said deformation estimating function executes, after estimating deformation of said graphic form to be examined as a whole, processing of dividing the graphic form to be examined in question into small regions to estimate the contents of deformation at each said small region.

50. The deformation correction program as set forth in claim 44, wherein said deformation estimating function executes, after estimating deformation of said graphic form to be examined as a whole, processing of referring to, with respect to each feature point pair in question, information of said feature point pairs in the vicinity to estimate and correct deformation in the vicinity of each said feature point pair.

* * * * *